(12) United States Patent
Tzika et al.

(10) Patent No.: US 10,639,828 B2
(45) Date of Patent: May 5, 2020

(54) DEVICE FOR DELIVERING AN INSULATION ENHANCING POLYURETHANE FOAM WITHIN PROFILES USED IN DOORS, WINDOWS AND RELATED APPLICATIONS

(71) Applicants: Asimo Tzika, Salonika (GR); Soultana Tzika, Salonika (GR)

(72) Inventors: Asimo Tzika, Salonika (GR); Soultana Tzika, Salonika (GR)

(*) Notice: Subject to any disclaimer, the term of this patent is extended or adjusted under 35 U.S.C. 154(b) by 449 days.

(21) Appl. No.: 15/318,784

(22) PCT Filed: Jun. 16, 2015

(86) PCT No.: PCT/GR2015/000031
§ 371 (c)(1),
(2) Date: Dec. 14, 2016

(87) PCT Pub. No.: WO2015/193692
PCT Pub. Date: Dec. 23, 2015

(65) Prior Publication Data
US 2017/0120485 A1   May 4, 2017

(30) Foreign Application Priority Data

Jun. 16, 2014  (GR) .............................. 20140100336

(51) Int. Cl.
  *B29C 44/18*  (2006.01)
  *B29C 44/38*  (2006.01)
  (Continued)

(52) U.S. Cl.
  CPC ............ *B29C 44/18* (2013.01); *B29B 7/7419* (2013.01); *B29B 7/7433* (2013.01);
  (Continued)

(58) Field of Classification Search
  CPC ..... B29C 44/10; B29C 44/12; B29C 44/1228; B29C 44/1233; B29C 44/1271;
  (Continued)

(56) References Cited

U.S. PATENT DOCUMENTS 4,588,541 A * 5/1986 Fowler ................ B29C 44/1233
                                                      264/261
4,720,951 A * 1/1988 Thorn ..................... B29C 44/18
                                                      49/DIG. 2

(Continued)

FOREIGN PATENT DOCUMENTS

DE   19848148 A1   4/2000
KR   101311473 B1  9/2013
(Continued)

*Primary Examiner* — Joseph S Del Sole
*Assistant Examiner* — Lawrence D. Hohenbrink, Jr.

(57) ABSTRACT

A device adapted to deliver an insulation enhancing polyurethane foam within profiles used in doors, windows and related applications comprising an insulating material supply member (1) extending into a polyurethane forming and discharge member (2) adapted to enter and move linearly along a chamber (25, 35) of a thermally insulated sash or frame profile assembly and deliver therein a polyurethane foam that absolutely abuts onto the walls of the chamber without exerting undesirable stresses thereupon. The insulating material supply member (1) comprises independent pipes (8, 9) delivering a polyol constituent (A) and an isocyanate constituent (B) that are mixed together with a supply of air within a mixing compartment (4) of the polyurethane forming and discharge member (2) to produce the desired insulating material. The polyurethane supplying assembly starts injection at one end of the profile bar having an industrial standard length and moves rearwards to fill the chamber with the polyurethane insulating material.

7 Claims, 6 Drawing Sheets

(51) Int. Cl.
- *B29C 44/60* (2006.01)
- *E06B 3/267* (2006.01)
- *B29B 7/74* (2006.01)
- *B29L 31/00* (2006.01)
- *B29K 75/00* (2006.01)
- *E06B 3/263* (2006.01)
- *E06B 3/62* (2006.01)
- *B29K 105/04* (2006.01)

(52) U.S. Cl.
CPC .......... *B29C 44/188* (2013.01); *B29C 44/386* (2013.01); *B29C 44/60* (2013.01); *E06B 3/2675* (2013.01); *B29B 7/7457* (2013.01); *B29K 2075/00* (2013.01); *B29K 2105/04* (2013.01); *B29L 2031/005* (2013.01); *E06B 3/267* (2013.01); *E06B 2003/26332* (2013.01); *E06B 2003/6244* (2013.01)

(58) Field of Classification Search
CPC ... B29C 44/1285; B29C 44/18; B29C 44/188; B29C 44/3442; B29C 44/386; B29B 7/7419; B29B 7/7457; E06B 3/267

USPC .......................................... 425/112; 264/46.6
See application file for complete search history.

(56) References Cited

U.S. PATENT DOCUMENTS

| | | | |
|---|---|---|---|
| 2005/0055973 A1* | 3/2005 | Hagen, Jr. | E04B 1/7604 52/741.1 |
| 2009/0004457 A1* | 1/2009 | Cho | B29C 44/12 428/305.5 |
| 2010/0101165 A1* | 4/2010 | Buffy | B29C 44/1233 52/309.4 |
| 2013/0037984 A1* | 2/2013 | Arnauts | B29C 44/1228 264/46.6 |
| 2014/0034756 A1* | 2/2014 | Gantenbein | B05B 7/0408 239/416.1 |

FOREIGN PATENT DOCUMENTS

| | | |
|---|---|---|
| WO | 2010014691 A1 | 2/2010 |
| WO | 2014126450 A1 | 8/2014 |

\* cited by examiner

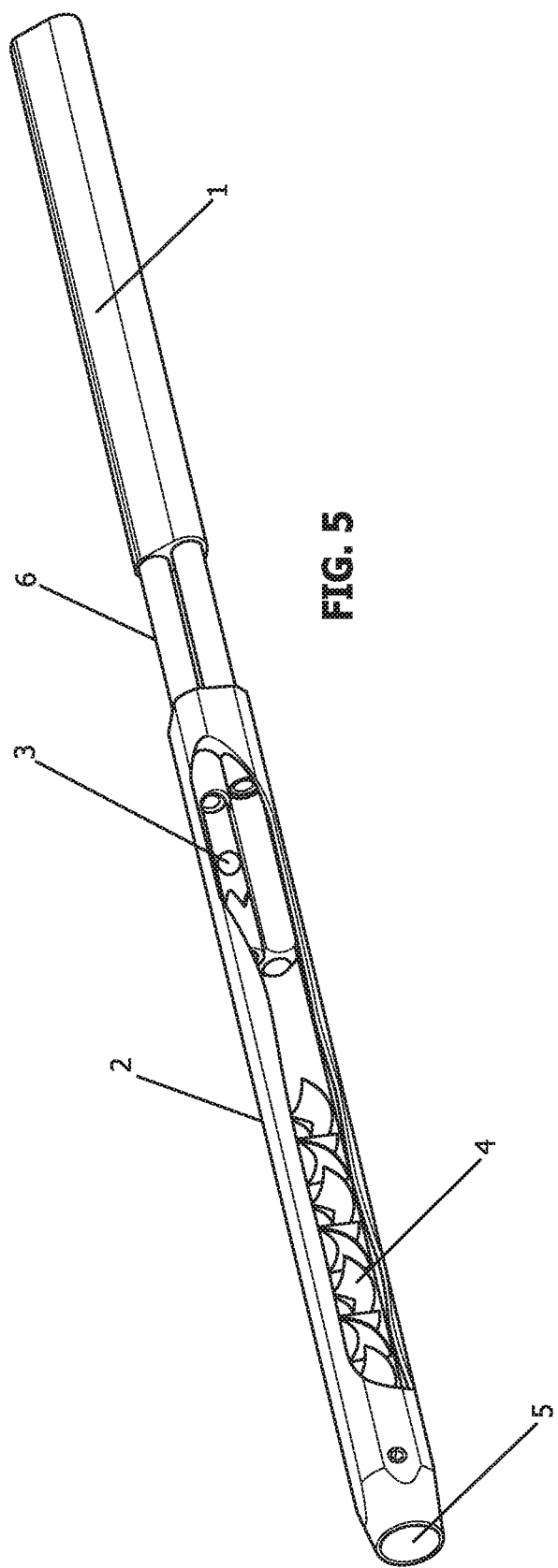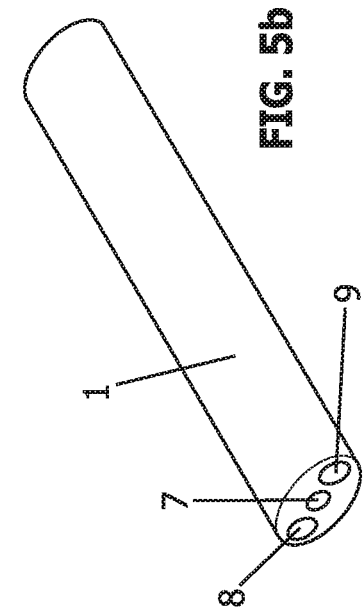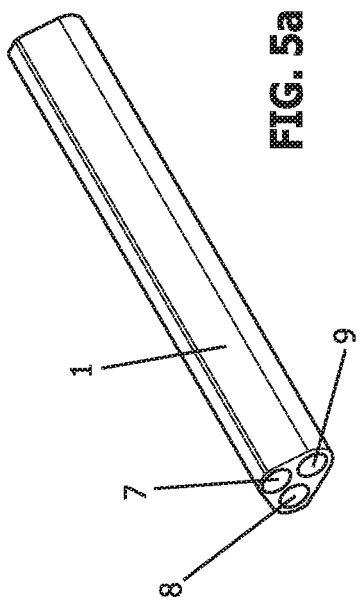

DEVICE FOR DELIVERING AN INSULATION ENHANCING POLYURETHANE FOAM WITHIN PROFILES USED IN DOORS, WINDOWS AND RELATED APPLICATIONS

THE FIELD OF THE ART

The invention relates to the field of the art of thermally insulated profile assemblies used in the construction of doors, windows or other related applications and proposes a device adapted to deliver a polyurethane foam insulating material of selected density linearly along a chamber being formed in between a pair of interconnected profile portions of a frame or sash profile, thereby achieving an absolute abutment of the insulating material onto the walls of the two profile portions and of the polyamide connecting members delimiting the chamber and constituting the walls of the so called thermal gap in between the two profile portions.

THE BACKGROUND OF THE INVENTION

Energy saving concerns has imposed optimization of the thermal insulation of the metallic profiles, most commonly aluminium profiles, used in the construction of the sash frames adapted to receive glass or shutter panels of doors and windows and of the frames within which such sash frames are installed. This requirement is equivalently applicable to the frame and sash profile members of various types of doors and windows, wherein the sash profile member may be hinged onto the frame profile member or it may slide or it may lift and slide, etc.

With a scope of optimizing thermal insulation, frame and sash profiles have been developed, which comprise a so-called "thermal gap", i.e. they are divided in two portions being connected with intermediate polyamide connecting members thereby forming an empty chamber delimited in between the opposing walls of the two profile portions and a pair of opposing polyamide connecting members. Whilst the air filling the hereinabove mentioned empty chamber already advantageously differentiates the temperature of the two profile portions since the air-filled gap interrupts the continuity of heat conductivity of the metallic profile, it is still far from accomplishing an ideal condition of thermal insulation wherein, whilst the exterior profile portion acquires the temperature of the exterior environment, the interior profile portion maintains the temperature of the interior of the building and thermal losses are eliminated.

With a scope of further enhancing thermal insulation characteristics of such thermally interrupted profile members, the prior art has proposed means and methods of filling such abovementioned air-filled gap with insulating material having a thermal conductivity inferior to that of the air and thereby being capable of rendering a profile member with enhanced thermal insulation characteristics.

An insulation enhancing method used in the prior art comprises the introduction of bars of insulating material, polystyrene or rigid polyurethane, within the abovementioned chamber in between the two profile portions. However, this necessitates maintaining a stock of a plurality of such bars of insulating material with an appropriate section to fit such thermal continuity interrupting chambers of the plurality of profile systems having varying dimensions and a standard length that necessitates cutting to fit within profiles of varying lengths being specified by specific application requirements. In addition to the storage costs of such a plurality of varying sections of insulating bars, cutting appropriate lengths of these bars and subsequently fitting them within the empty chambers results to escalated installation costs as well, yet with minimal and uncertain effectiveness in the eventual improvement in thermal conductivity being obtained due to the unattainable precise abutment of these bars onto the side walls of the profile portions and onto the polyamide connecting members. It has been verified that thermal conductivity of a thermally insulated profile comprising two portions with a thermal gap in between them being filled with an appropriately sectioned insulating bar of polystyrene or polyurethane is substantially inferior to that of the insulating bar.

Another insulation enhancing method being employed in the prior art is through filling the chamber in between the interconnected profile portions with polyurethane foam being supplied within the chamber through appropriately spaced holes being drilled onto the lateral walls of the profile portions. However, again such dynamically performed insulating operation still fails to provide optimum insulating properties to the final profile product due to uneven, uncontrolled flow rate of the foam being supplied in a direction transversely to the chamber and dispersed longitudinally along the chamber that is delimited by the side walls of the profile portions and the polyamide profiles interconnecting the same. The resulting solid body of the polyurethane foam being supplied lacks uniformity of shape and is expected to fail to provide a precise abutment onto the walls of the chamber, whilst such uneven mass thereof might lead to development of stresses that tend to deform and weaken the strength of the final insulated profile product. Most importantly, the density of the insulating material that is a substantial parameter of the eventual insulating characteristics of the final insulated profile product varies in the linear direction and cannot be controlled with a scope of providing optimum insulating characteristics.

It is an object of the present invention to advantageously overcome the deficiencies in accomplishing an optimized thermal insulation of the profiles used in the construction of the frames adapted to receive glass or shutter panels of doors and windows as such deficiencies are encountered in the prior art and provide a device capable of delivering the insulating material linearly along the empty chamber being formed in between the two interconnected profile portions of a frame or sash profile and of achieving an absolute abutment of the insulating material onto the walls of the two profile portions and of the polyamide connecting members delimiting the chamber and constituting the walls of the so called thermal gap in between the two profile portions, thereby ensuring a controlled uniform section and uniform density of the insulating material throughout the length of industrially produced profile portions appropriately assembled with the intermediate polyamide connecting members.

It is a further object of the invention to produce profile assemblies incorporating the proposed insulating material with the latter having a density that may be selectively chosen to have a specific value within a range of 30-90 $Kg/m^3$ and appropriately chosen to meet requirements for varying applications, i.e. preferably a density within a range of 40-60 $Kg/m^3$ is chosen for profiles wherein an optimum coefficient of thermal conductivity is required thereby ensuring optimum insulating characteristics, whereas a density of a higher value may render profiles of enhanced rigidity and strength.

Another object of the invention is to provide filling of the chambers of the profile portions of a thermally insulated profile assembly adjacent to the centrally located chamber of the so-called "thermal gap" with the same insulating material, thereby enhancing thermal insulation and further obtaining an enhanced soundproof quality of the assembled profile.

A further object of the invention is to propose a composition of the insulating material comprising two distinct components which are being supplied through independent pipes together with an air supply pipe, all three pipes incorporated within an insulating material supply member and jointly driven longitudinally along the chamber of the profile assembly wherein the insulating material is being supplied and thoroughly mixed to form a polyurethane foam that thoroughly fills the aforementioned chamber.

A further object of the invention is to provide alternative configurations of the aforementioned insulating material supply member with a scope of appropriately implementing the insulating process of the invention in profile assemblies having thermal gap chambers of varying configurations and dimensions, whereby in particular said insulating material supply member incorporating the air supply pipe and the pipes of the two distinct components alternatively takes a substantially elliptical form with the three pipes being serially arranged or a triangular form with the three pipes being located at the apexes of the triangularly configured insulating material supply member.

A further object of the invention is to propose the polyurethane supply device equipped with a central processing unit adapted to receive data of ambient conditions of temperature and humidity, as well as of the dimensions of the chamber and the length of the profile that is subject to receive the insulating material and appropriately adjust the quantity of the constituent parts of the insulating material with a scope of obtaining a final insulating product of the desired density.

A further object of the invention is to provide the device that delivers the aforementioned insulating material linearly along the empty "thermal gap" chamber equipped with a mixing unit wherein the constituent parts of the aforementioned composition supplied through said insulating material supply member are mixed to form the polyurethane foam insulating material incorporating a non-return valve adapted to avert reverse flow of the constituent materials, wherein said insulating material supply member and the mixing unit are adapted to perform a three-dimensional displacement with a scope of orienting a polyurethane delivery nozzle located downstream the mixing unit centrally within the chamber subject to being filled with the polyurethane insulating material.

Another object of the invention is to provide the aforementioned polyurethane delivery nozzle with a rotating capacity with a scope of aligning said nozzle in the longitudinal direction of the profile assembly subject to being filled with the polyurethane insulating material.

BRIEF DESCRIPTION OF THE DRAWINGS

The invention will be best understood by those skilled in the art by reference to the accompanying drawings in which:

FIG. 5 shows a perspective view of a portion of an insulating material supply member of the device connected to the polyurethane forming and discharge member thereof.

FIGS. 5a and 5b show the pipes delivering the constituent materials to the polyurethane forming and discharge member for forming a polyurethane foam in an alternatively triangular and serial arrangement respectively.

DESCRIPTION OF PREFERRED
EMBODIMENTS OF THE INVENTION

The invention will be hereinafter described by reference to the illustrative embodiments presented in the accompanying drawings. The invention is directed to the field of the art of aluminium profiles for doors, windows or other applications, but it may extend to cover profiles made from other materials as well.

Figure 1C:
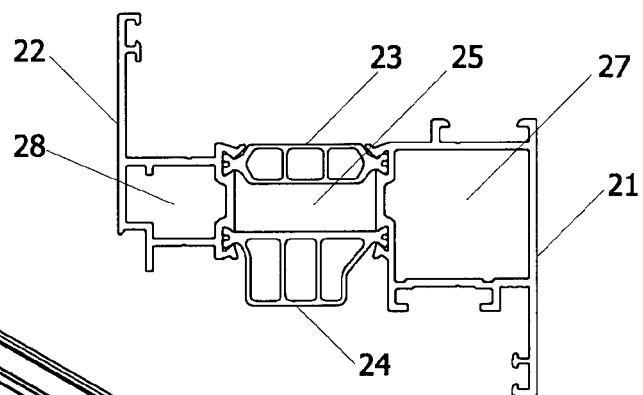
FIGS. 1c and 1d show assembled views of the conventional thermally insulated sash and frame profile assembly shown in FIGS. 1a and 1b respectively.
Figure 1A:
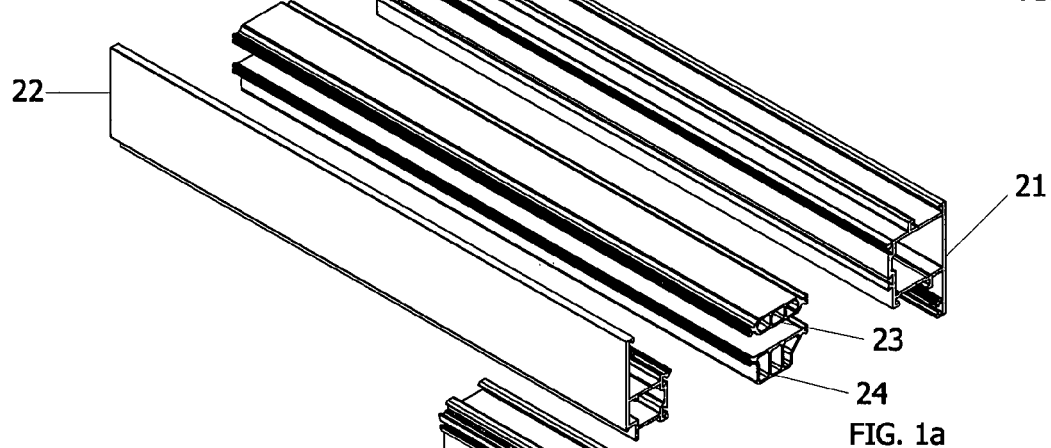
FIGS. 1a and 1b show an exploded view of the parts constituting a conventional thermally insulated sash and frame profile assembly respectively adapted to form a door/window arrangement wherein the sash is hinged onto the frame profile assembly and rotates when being opened and closed.
Figure 1B:
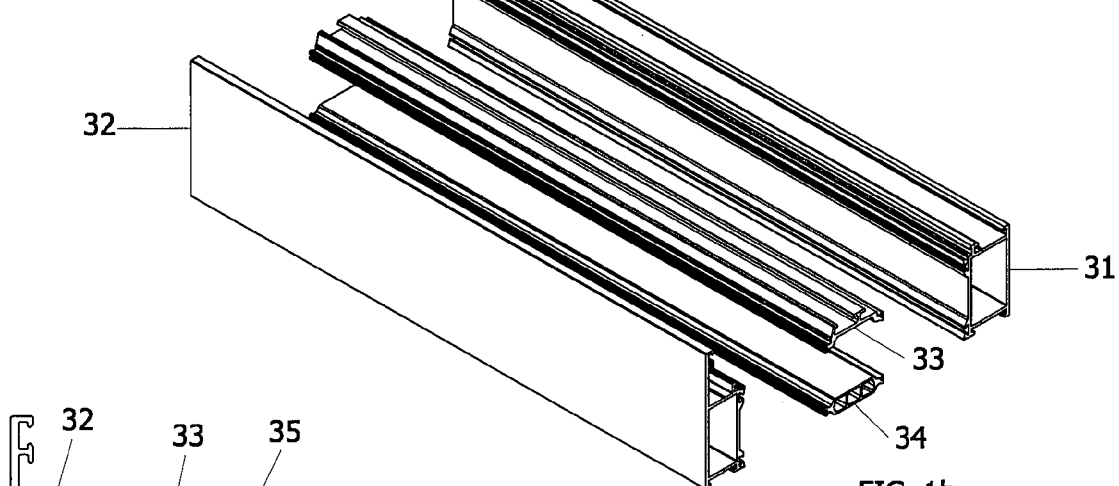
Figure 1D:
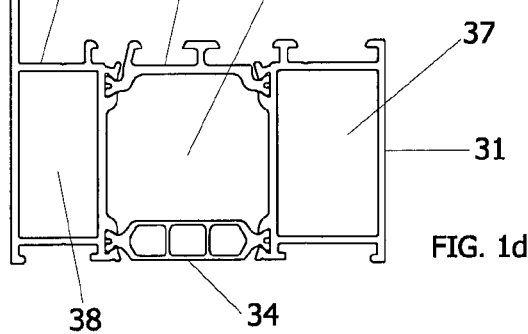
Figure 2A:
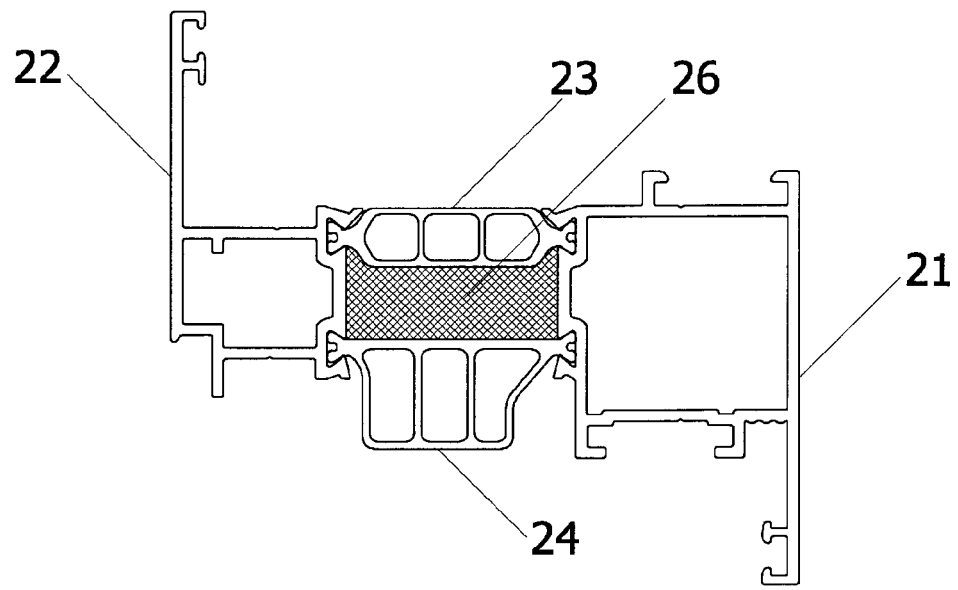
FIGS. 2a and 2b show the assembled thermally insulated sash and frame profile assemblies of FIGS. 1c and 1d respectively with the chamber constituting the thermal gap between the profile portions interconnected by polyamide profiles filled with the insulating material of the invention.
Figure 2B:
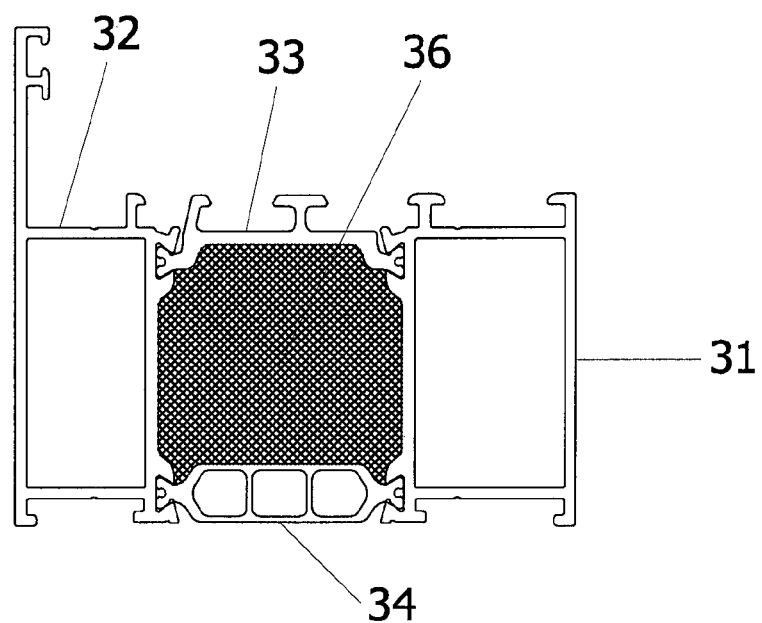
Figure 2C:
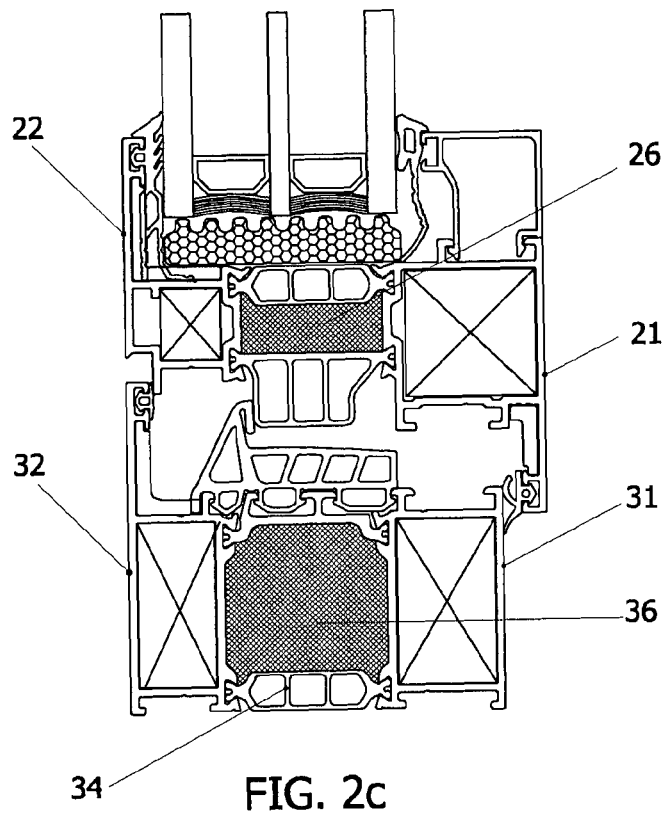
FIG. 2c shows the sash and frame profile assemblies of FIGS. 2a and 2b assembled in an operating condition of a door/window arrangement wherein the sash is hinged onto the frame profile assembly and rotates when being opened and closed.
Figure 2D:
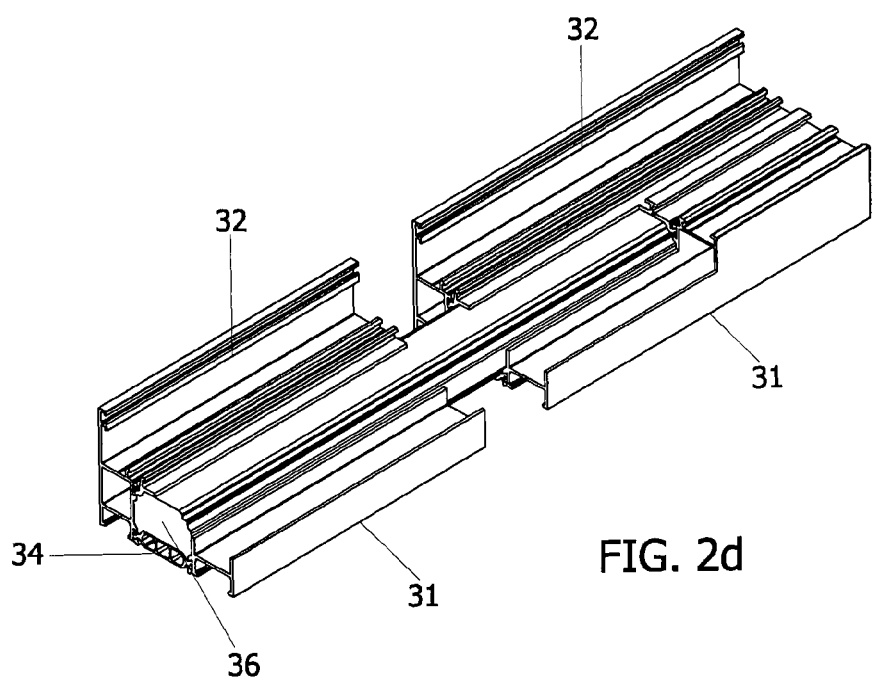
FIG. 2d shows a perspective view of the frame profile assembly of FIG. 2b incorporating the insulating material of the invention within the chamber constituting the thermal gap between the adjacent profile portions.

The invention discloses a device adapted to deliver a polyurethane foam insulating material within a chamber being formed in between a pair of profile portions of a thermally insulated frame or sash profile assembly with a scope of enhancing the thermal insulation properties thereof. FIGS. 1a, 1c show a typical sash profile assembly of a sash adapted to be hinged to a frame and opened through rotation around the axis of the hinges, such sash being divided in two portions 21, 22, which are interconnected with polyamide connecting members 23, 24 so as to form a thermal gap chamber 25 being delimited by the side walls of profile portions 21, 22 and the walls of the polyamide connecting members 23, 24. Accordingly a typical cooperating frame profile member in this hinged system as shown in FIGS. 1b, 1d is divided in two portions 31, 32, which are interconnected with polyamide connecting members 33, 34 so as to form a thermal gap chamber 35 being delimited by the side walls of profile portions 31, 32 and the walls of the polyamide connecting members 33, 34.

Figure 3:
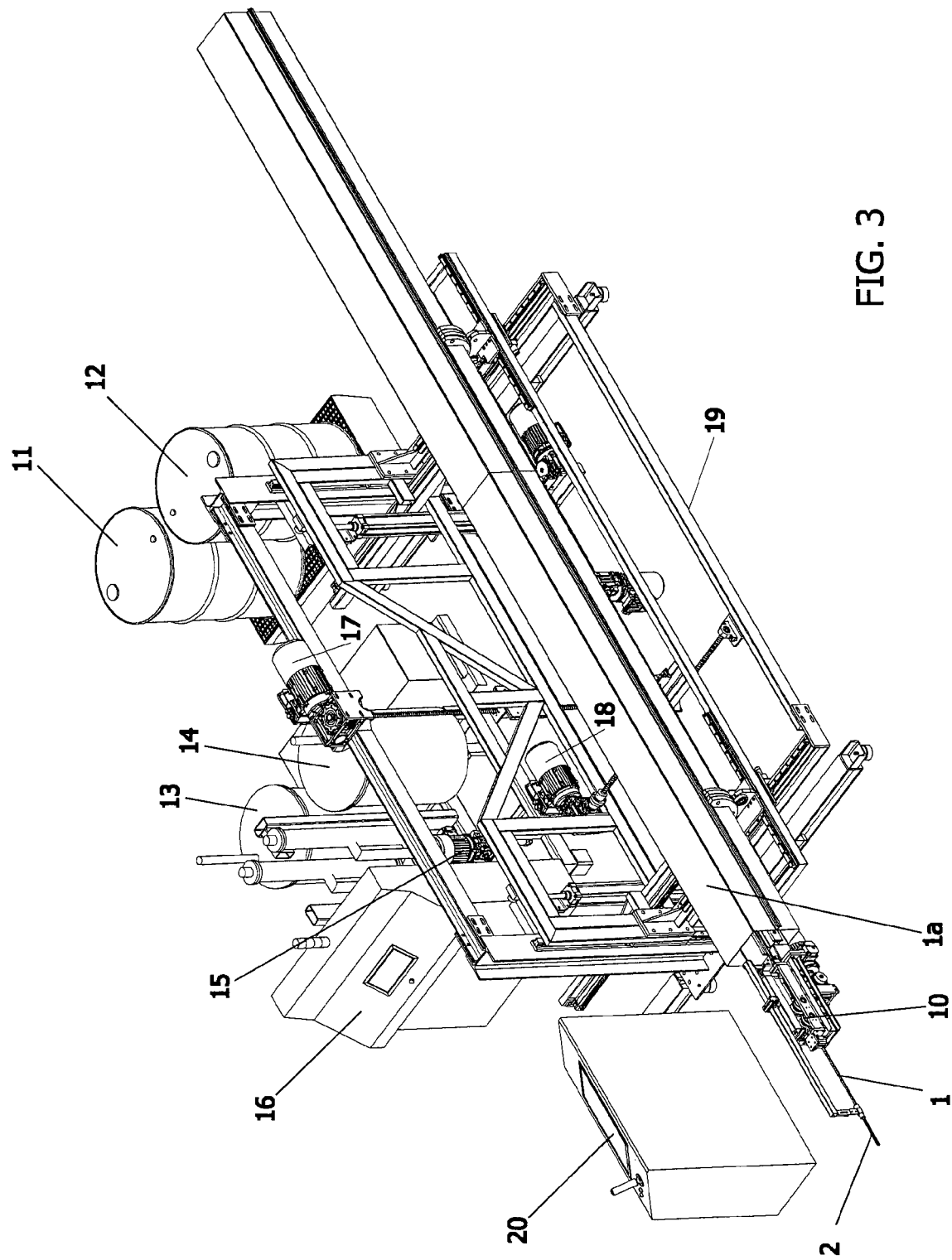
FIG. 3 shows a perspective view of the device of the invention adapted to deliver a polyurethane foam insulating material of selected density linearly along the chamber being formed between the pair of interconnected profile portions of the frame profile assembly.
Figure 4:
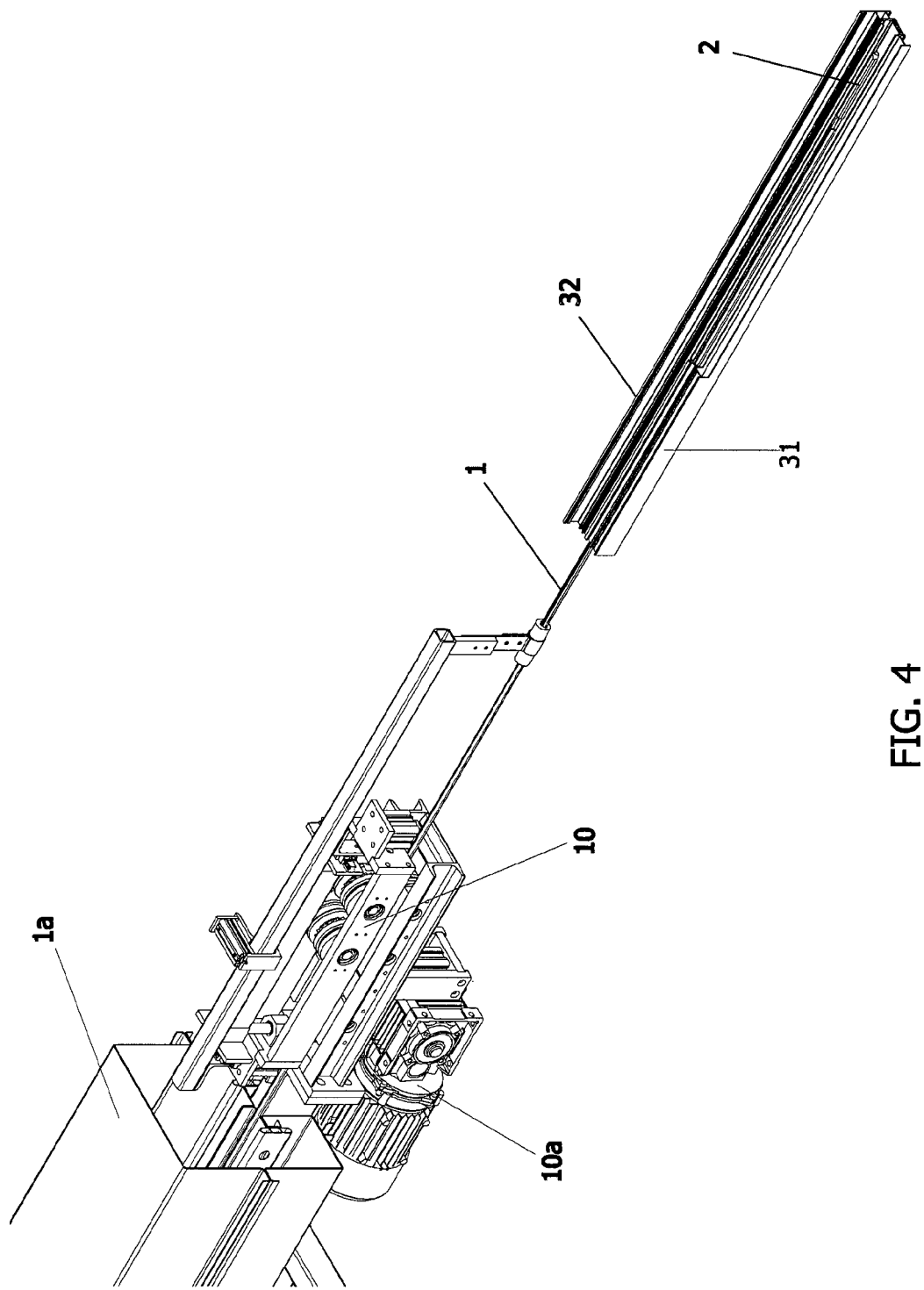
FIG. 4 shows a perspective view of an operating phase of the device of the invention wherein a polyurethane forming and discharge member thereof enters linearly along a previously formed chamber defining the thermal gap of the thermally insulated profile assembly.

The device of the invention shown in FIG. 3 comprises an insulating material supply member 1 housed within a housing 1a and adapted to enter and move linearly along the chamber 25, 35 of a thermally insulated sash or frame profile assembly respectively. This insulating material supply member 1 comprises two independent pipes 8, 9 delivering two distinct constituents (A) and (B) of the insulating material and an air supply pipe 7 being connected to a main compressed air supply of the industrial plant wherein the abovementioned profiles are being manufactured. The two pipes 8, 9 are adapted to provide delivery of the distinct constituents (A) and (B) of the insulating material and are jointly driven together with the air supply pipe 7 longitudinally along the aforementioned chamber 25 or 35 of the thermally insulated sash or frame profile assembly respectively that is subject to being filled with the insulating material. As shown in FIG. 4 a motor 10a is employed to linearly slide a trolley 10, carrier of the insulating material supply member 1 at first in a direction out of the housing 1a, into chamber 25, 35 and thereafter in the reverse direction.

The outlet of the pipes 7, 8, 9 of the insulating material supply member 1 are being connected through connecting pipes 6 to a polyurethane forming and discharge member 2 that comprises a non-return valve 3 adapted to avert reverse flow of the abovementioned constituents (A) and (B) flowing within pipes 8 and 9 and a mixing compartment 4 wherein constituents (A) and (B) are mixed and form the polyurethane foam insulating material. A polyurethane supply nozzle 5 is located at the exit of the polyurethane forming and discharge member 2.

In accordance with a preferred embodiment of the invention the insulating material supply member 1 incorporating the air supply pipe 7 and the pipes 8 and 9 of the two distinct constituents (A) and (B) may alternatively take a substantially elliptical form with the three pipes 8, 7, 9 being serially arranged as shown in FIG. 5b or a triangular form with the three pipes 7, 8, 9 being located at the apexes of a triangularly configured insulating material supply member 1 as shown in FIG. 5a. The triangular pipe arrangement is preferably employed in association with a chamber 25 or 35 of the thermally insulated sash or frame profile assembly with a substantially square configuration, whereas a serial pipe arrangement is preferred in association with profiles having a relatively swallow and wide chamber 25, 35. Selection of the triangular or serial pipe arrangement is performed prior to the introduction of the polyurethane forming and discharge member 2 in chamber 25, 35

In accordance with another preferred embodiment of the invention the insulating material supply member 1 and the polyurethane forming and discharge member 2 are adapted to perform a three-dimensional displacement with a scope of orienting the polyurethane delivery nozzle 5 located downstream the mixing unit 4 centrally within the chamber subject to being filled with the polyurethane insulating material.

Furthermore the aforementioned polyurethane delivery nozzle 5 may be provided with a rotating capacity through an arc of −45° to +45° with a scope of aligning the nozzle in the longitudinal direction of the profile assembly subject to being filled with the polyurethane insulating material.

A polyurethane injection process through the polyurethane supply nozzle 5 at the fore end of said polyurethane forming and discharge member 2 is initiated after the assembly of the insulating material supply member 1 and the polyurethane forming and discharge member 2 have been driven within the chamber 25, 35 close to one end (at a distance of the order of 300 mm from the end) of the sash or frame profile length and the chamber is then thoroughly filled with the polyurethane foam insulating material 26, 36 respectively as the the aforementioned assembly moves rearward at a predetermined speed selected in accordance with the profile type not exceeding a speed of the order of 100 m/min.

As shown in FIG. 3, the device of the invention further comprises an arrangement administering the parameters of the polyurethane forming constituents (A) and (B), this arrangement including containers 13, 14 continuously filled with the constituents (A) and (B), pumps adapted to pump the constituents from corresponding tanks 11, 12 and maintain the containers 13, 14 in a continuously filled condition so that the insulating material injection process might not be interrupted at any time. The arrangement further comprises pumps 15 adapted to deliver the constituents (A) and (B) into the aforementioned pipes 8, 9 of the insulating material supply member 1 and an electronics and circuitry unit 16 that controls the entire process in association with a central processing unit 20 that is adapted to receive data of ambient conditions of temperature and humidity, of the dimensions of chambers 25, 35 and of the length of the profile assembly subject to receive the insulating material (normally of the order of 6 m) and henceforth appropriately adjust the quantity of the constituents (A) and (B) of the insulating material being supplied to the insulating material supply member 1 with a scope of obtaining a polyurethane foam insulating product of a selected density.

The density of the polyurethane foam insulating product may be selectively chosen to have a specific value within a range of 30-90 Kg/m$^3$ and appropriately chosen to meet requirements for varying applications. By way of example, a density within a range of 40-60 Kg/m$^3$ is chosen for profiles that require an optimum coefficient of thermal conductivity thereby ensuring optimum insulating characteristics, whereas a density of a higher value may render profiles of enhanced rigidity and strength.

An illustrative composition of the polyurethane foam forming constituents (A) and (B) is a polyol mixture containing a stabilizer, catalyst and blowing agent HFC for constituent (A) and an isocyanate, illustratively available as V-Iso M 200 (p-MDI) for constituent (B), wherein the above two constituents (A):(B) are being mixed in the presence of air to form the polyurethane foam being supplied onto a previously cleaned, dry and dust free surface with no foreign particles that can reduce the adhesion onto the walls of the profile, since the invention aims at an absolute abutment onto the profile walls throughout the length thereof. The mixing ratio of Polyol:Isocyanate preferably is 100:100 parts by volume and 100:110 parts by weight.

As shown in FIG. 3, the device is based onto an infrastructure 19. According to a preferred embodiment of the invention the infrastructure 19 is being adapted to move vertically through a driving motor and endless screw assembly 17 in order to sequentially deliver the insulation enhancing polyurethane foam within a plurality of profiles arranged one above another in a vertical direction and is further being adapted to move horizontally through a driving motor and endless screw assembly 18 in order to sequentially deliver the insulation enhancing polyurethane foam within a plurality of profiles arranged one adjacent to another in a horizontal direction It must hereby be noted that delivery of the insulation enhancing polyurethane foam of the invention may be performed within the aforementioned thermal gap central chambers 25, 35 of sash and frame profiles used in doors and windows, but it may also be performed within the chambers of the profiles located adjacently to these central thermal gap chambers 25, 35, such as the sash profile chambers 27, 28 shown in FIG. 1c or the frame profile chambers 37, 38 shown in FIG. 1d. The additional insulating of these adjacent chambers renders the entire profile much stronger and with increased insulation characteristics, notably also having optimum sound-proof characteristics also. Filling chambers of ordinary profiles, which do not comprise two portions but are a single element, with the polyurethane foam composition employing the device of the invention also results in a substantial improvement of their thermal insulation characteristics.

The invention may be applied to all types of profiles, hinged, sliding, lift and slide, etc., made from aluminium or other material, either prior or after their being painted in the desired colour.

The invention claimed is:

1. A device adapted to deliver an insulation enhancing polyurethane foam within profiles used in doors, windows and related applications, wherein said insulation enhancing polyurethane foam is supplied within a chamber (25, 35) being formed in between a pair of profile portions (21, 22) of a thermally insulated sash profile assembly or a pair of profile portions (31, 32) of a thermally insulated frame profile assembly, said pairs of profile portions (21, 22), (31, 32) being interconnected with a pair of polyamide profile connecting members (23, 24) and (33, 34) respectively, said chamber (25, 35) being delimited by adjacent walls of the profile portions (21, 22) and (31, 32) and the polyamide profile connecting members (23, 24) and (33, 34), said device comprising:

an insulating material supply member (1) housed within a housing (1a) and adapted to slide outwardly from said housing (1a) and move linearly along said chamber (25, 35) of a thermally insulated sash or frame profile assembly, said insulating material supply member (1) comprising two independent pipes (8, 9) delivering two distinct constituents (A) and (B) of insulating material and an air supply pipe (7), said two pipes (8, 9) delivering the distinct constituents (A) and (B) of the insulating material and said air supply pipe (7) being jointly driven longitudinally along said chamber (25, 35) of the thermally insulated sash or frame profile assembly subject to being filled with said insulating material;

a polyurethane forming and discharge member (2) comprising a non-return valve (3) adapted to avert reverse flow of said constituents (A) and (B), a mixing compartment (4) wherein said constituents (A) and (B) are mixed and form a polyurethane foam insulating material and a polyurethane supply nozzle (5), said polyurethane forming and discharge member (2) being adapted to receive a predetermined flow of said two constituents (A) and (B) delivered from said pipes (8, 9) and of air delivered through said air supply pipe (7), flowing past said non-return valve (3) within said mixing compartment (4), whereby said polyurethane foam is being discharged through said polyurethane supply nozzle (5) at a fore end of said polyurethane forming and discharge member (2), said polyurethane forming and discharge member (2) being adapted to initiate injection of the polyurethane foam within said chamber (25, 35) at one end of the sash or frame profile length with a scope of filling said chamber (25, 35) with the polyurethane foam insulating material (26, 36) as the polyurethane supply nozzle (5) moves rearward at a predetermined speed until the polyurethane supply nozzle (5) reaches another end of said sash or frame profile length;

an arrangement administering the parameters of said constituents (A) and (B) including containers (13, 14) continuously filled with said constituents, pumps adapted to pump the constituents from corresponding tanks (11, 12) and fill said containers (13, 14) with said constituents (A) and (B) and pumps (15) adapted to deliver said constituents (A) and (B) to said pipes (8, 9) and an electronics and circuitry unit (16), and a central processing unit (20) adapted to receive data of ambient conditions of temperature and humidity and of dimensions of said chambers (25, 35) and of length of the thermally insulated sash or frame profile assembly subject to receive the insulating material and appropriately adjust a quantity of the constituents (A) and (B) of the insulating material being supplied to said insulating material supply member (1) with a scope of obtaining a polyurethane foam insulating product of a selected density, wherein said insulating material supply member (1) and said polyurethane forming and discharge member (2) are adapted to perform a three-dimensional displacement to orient said polyurethane delivery nozzle (5) centrally within the chamber (25, 35) subject to being filled with the polyurethane insulating material and in that said polyurethane delivery nozzle (5) is provided with a rotating capacity through an arc of −45° to +45° to align the polyurethane delivery nozzle (5) in the longitudinal direction of the sash or frame profile assembly subject to being filled with the polyurethane foam insulating material.

2. The device adapted to deliver an insulation enhancing polyurethane foam within profiles used in doors, windows and related applications according to claim 1, wherein said insulating material supply member (1) incorporating the air supply pipe (7) and the pipes (8) and (9) of the two distinct constituents (A) and (B) is alternatively selected to take a substantially elliptical form with the three pipes (8, 7, 9) being serially arranged or a triangular form with the three pipes (7, 8, 9) being located at apexes of a triangularly configured insulating material supply member (1).

3. The device adapted to deliver an insulation enhancing polyurethane foam within profiles used in doors, windows and related applications according to claim 1, wherein the device is based onto an infrastructure (19) that is being adapted to move vertically by means of a driving motor and endless screw assembly (17) in order to sequentially deliver the insulation enhancing polyurethane foam within a plurality of profiles arranged one above another in a vertical direction and to move horizontally by means of a driving motor and endless screw assembly (18) in order to sequentially deliver the insulation enhancing polyurethane foam within a plurality of profiles arranged one adjacent to another in a horizontal direction.

4. Thermally insulated profile assemblies comprising sash profile members used in the construction of sash frames adapted to receive glass or shutter panels of doors, windows and related applications and frame profile members within which said sash frames are installed, wherein said sash profile members are either hinged onto said frame profile members or adapted to slide or lift and slide thereupon, each said sash profile member comprising a pair of profile portions (21, 22) and each said frame profile member comprising a pair of profile portions (31, 32), said pairs of profile portions (21, 22), (31, 32) being interconnected with a pair of polyamide profile connecting members (23, 24) and (33, 34) respectively, chambers (25, 35) being formed in between said pairs of profile portions (21, 22), (31, 32) respectively, said chambers (25, 35) being delimited by adjacent walls of the profile portions (21, 22) and (31, 32) and the polyamide profile connecting members (23, 24) and (33, 34) respectively, wherein an insulation enhancing polyurethane foam insulating material (26, 36) having a uniform section and uniform density fills said chambers (25, 35) and abuts the adjacent walls of said profile portions (21, 22), (31, 32) and the polyamide profile connecting members (23, 24) and (33, 34) throughout the length of said thermally insulated profile assemblies respectively, said polyurethane foam insulating material (26, 36) having been injected within said chambers (25, 35) by a polyurethane supply nozzle (5) of a polyurethane forming and discharge member (2) adapted to move at a predetermined speed linearly along said chamber (25, 35) and comprising a mixing compartment (4) wherein are being supplied air together with a constituent (A) of a polyol mixture containing a stabilizer, catalyst and blowing agent HFC and a constituent (B) of an isocyanate, said constituents (A):(B) being mixed at a mixing ratio of Polyol:Isocyanate of 100:100 parts by volume and 100:110 parts by weight to form said polyurethane foam insulating material (26, 36).

5. A method for producing thermally insulated profile assemblies using the device of claim 1 for injecting polyurethane foam insulating material (26, 36) comprising constituents (A) and (B) within a chamber (25, 35) formed in between profiles used in doors, windows and related applications, said chamber (25, 35) being formed in between a pair of profile portions (21, 22) of a thermally insulated sash profile assembly or a pair of profile portions (31, 32) of a thermally insulated frame profile assembly, said pairs of profile portions (21, 22), (31, 32) being interconnected with a pair of polyamide profile connecting members (23, 24) and (33, 34) respectively, said chamber (25, 35) being delimited by the walls of the adjacent profile portions (21, 22) and (31, 32) and the polyamide profile connecting members (23, 24) and (33, 34), said method comprising:

rotating the polyurethane delivery nozzle (5) of the polyurethane and discharge member (2) of said device through an arc of −45° to +45° with a scope of aligning the polyurethane delivery nozzle (5) in the longitudinal direction of the sash or frame profile assembly subject to being filled with the polyurethane foam insulating material, centrally orienting the polyurethane delivery nozzle (5) of the polyurethane forming and discharge member (2) within said chamber (25, 35), driving the assembly of the insulating material supply member (1) and the polyurethane forming and discharge member (2) of said device within the chamber (25, 35) at a distance of the order of 300 mm from one first end of the sash or frame profile length, adjusting, with regard to the ambient conditions of temperature and humidity and of the dimensions of said chamber (25, 35) and of the length of the profile assembly subject to receive the polyurethane foam insulating material (26, 36), the quantity of constituents (A) and (B) of the polyurethane foam insulating material (26, 36) being supplied to said insulating material supply member (1) with a scope of obtaining a polyurethane foam insulating product of a selected density, and initiating injection of the polyurethane foam insulating material (26, 36) within said chamber (25, 35) at the distance of the order of 300 mm from the first end of the sash or frame profile length with a scope of filling said chamber (25, 35) with the polyurethane foam insulating material (26, 36) as said polyurethane forming and discharge member (2) moves rearward at a predetermined speed until it reaches the second end of said sash or frame profile length, wherein the thermally insulated profile assemblies comprise sash profile members used in the construction of sash frames adapted to receive glass or shutter panels of doors, windows and related applications and frame profile members within which said sash frames are installed, wherein said sash profile members are either hinged onto said frame profile members or adapted to slide or lift and slide thereupon, each said sash profile member comprising a pair of profile portions (21, 22) and each said frame profile member comprising a pair of profile portions (31, 32), said pairs of profile portions (21, 22), (31, 32) being interconnected with a pair of polyamide profile connecting members (23, 24) and (33, 34) respectively, chambers (25, 35) being formed in between said pairs of profile portions (21, 22), (31, 32) respectively, said chambers (25, 35) being delimited by adjacent walls of the profile portions (21, 22) and (31, 32) and the polyamide profile connecting members (23, 24) and (33, 34) respectively, wherein an insulation enhancing polyurethane foam insulating material (26, 36) having a uniform section and uniform density fills said chambers (25, 35) and abuts the adjacent walls of said profile portions (21, 22), (31, 32) and the polyamide profile connecting members (23, 24) and (33, 34) throughout the length of said thermally insulated profile assemblies respectively, said polyurethane foam insulating material (26, 36) having been injected within said chambers (25, 35) by a polyurethane supply nozzle (5) of a polyurethane forming and discharge member (2) adapted to move at a predetermined speed linearly along said chamber (25, 35) and comprising a mixing compartment (4) wherein are being supplied air together with a constituent (A) of a polyol mixture containing a stabilizer, catalyst and blowing agent HFC and a constituent (B) of an isocyanate, said constituents (A):(B) being mixed at a mixing ratio of Polyol:Isocyanate of 100:100 parts by volume and 100:110 parts by weight to form said polyurethane foam insulating material (26, 36).

6. The method according to claim 5, wherein a composition of the polyurethane foam forming constituents (A) and (B) is a polyol mixture containing a stabilizer, catalyst and blowing agent HFC for constituent (A) and an isocyanate for constituent (B), wherein the above two constituents (A):(B) are being mixed at a mixing ratio of Polyol:Isocyanate of 100:100 parts by volume and 100:110 parts by weight.

7. The method according to claim 5, wherein the density of the polyurethane foam insulating material (26, 36) is chosen to have a specific value within a range of 30-90 $Kg/m^3$, wherein a density within a range of 40-60 $Kg/m^3$ is chosen for profiles that have a requirement of an optimum coefficient of thermal conductivity thereby ensuring optimum insulating characteristics, whereas a density of a higher value exceeding 60 $Kg/m^3$ is chosen for rendering profiles of enhanced rigidity and strength.

* * * * *